May 18, 1937.   M. E. BOWEN   2,080,687
DUAL MASTER CYLINDER HYDRAULIC BRAKE
Filed Dec. 29, 1934   2 Sheets-Sheet 1

INVENTOR.
Max E. Bowen
BY Chappell + Earl
ATTORNEYS.

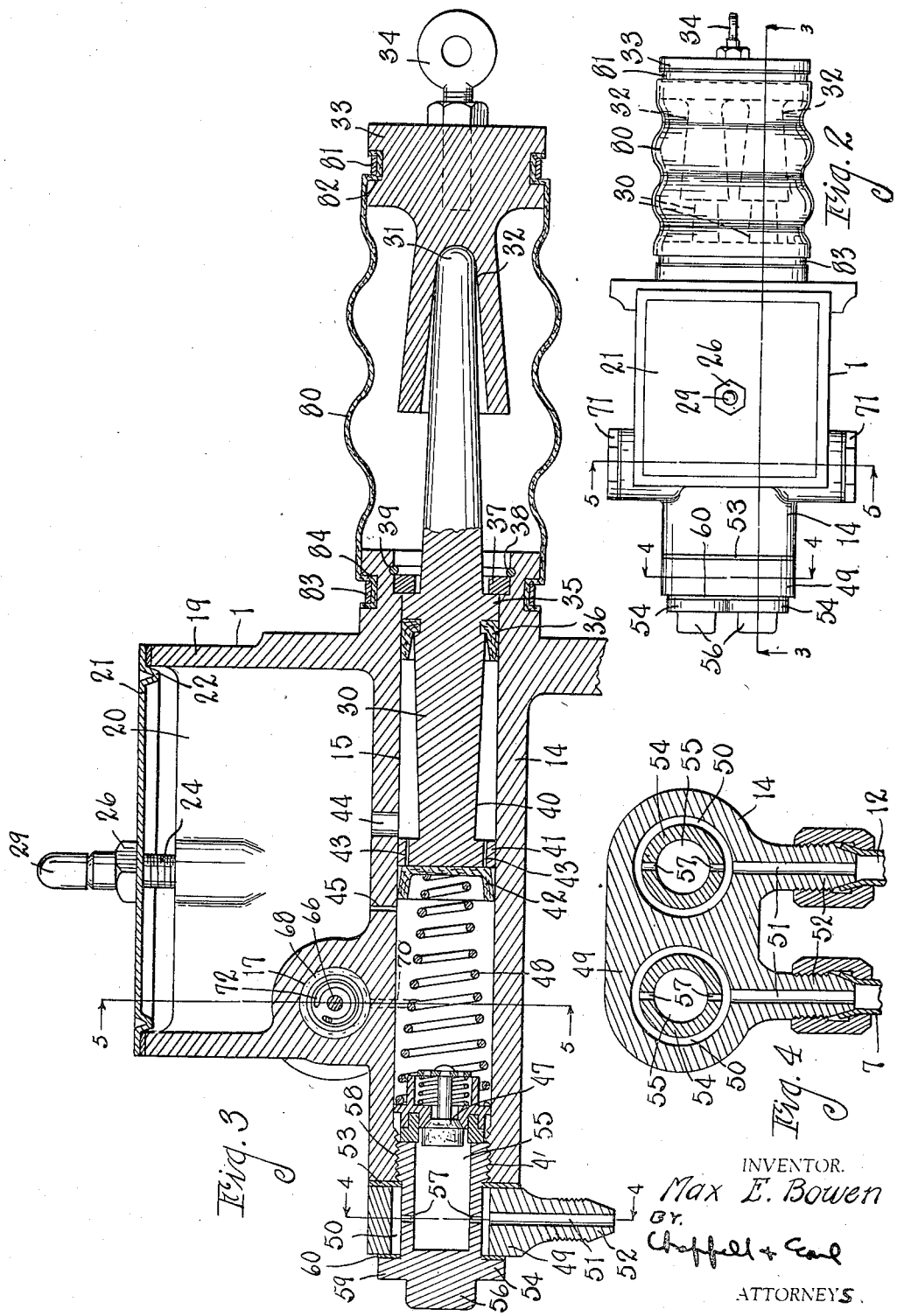

Patented May 18, 1937

2,080,687

UNITED STATES PATENT OFFICE 2,080,687

DUAL MASTER CYLINDER HYDRAULIC BRAKE

Max E. Bowen, Grand Rapids, Mich.

Application December 29, 1934, Serial No. 759,646

10 Claims. (Cl. 60—54.5)

The objects of this invention are:

First, to produce an improved hydraulic braking system for vehicles.

Second, to provide such a system in which front and rear vehicle wheels have separate systems so that a failure along the line of one system does not cause a failure of the other system to prevent stopping the vehicle.

Third, to provide such a system in which separate master cylinders operate on the hydraulic fluid of the two separate systems.

Fourth, to provide such a system in which the braking effect on the front and rear wheels is equalized.

Fifth, to provide such a system in which the pressure exerted in the cylinders is equalized to cause equal application of the brakes.

Sixth, to provide such a system with an equalizer that is effective to equalize the pressure between the two master cylinders during normal braking activity, but in which a rupture of one hydraulic system will not prevent the other system from applying brakes to the vehicle.

Seventh, to provide a new and improved arrangement of parts for convenient and economical manufacture of the apparatus.

Eighth, to provide a new and improved equalizer for equalizing pressures in a pair of master cylinders.

Ninth, to provide such a new and improved equalizer in which on a rupture or failure of one master cylinder, the other master cylinder is permitted to function while the equalizer remains inoperative and does not interfere with further use of the effective master cylinder.

Further objects and advantages pertaining to details and economies of construction and operation will appear from the description to follow.

A preferred embodiment of my invention is illustrated in the accompanying drawings, in which:

Fig. 2 is a plan view of my dual master cylinder and equalizer.

Fig. 3 is a sectional elevation of my master cylinders and equalizer taken on line 3—3 of Figs. 2 and 5.

Fig. 4 is a sectional view taken on line 4—4 of Fig. 3.

Figure 1:
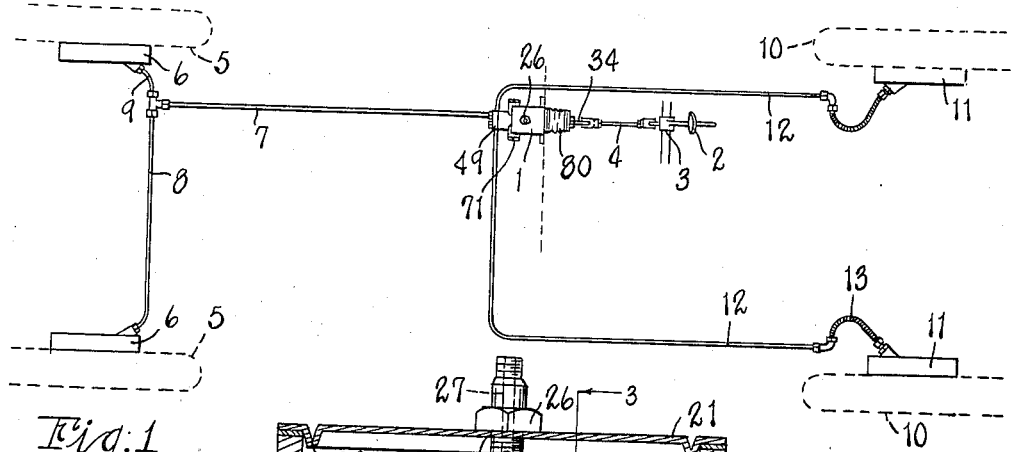
Fig. 1 is a diagrammatic view of a vehicle with my hydraulic braking system installed thereon.

Referring to Fig. 1, I is my improved dual master cylinder and equalizer having a brake pedal 2 pivoted at 3 and connected thereto by linkage 4. 5 are the rear wheels of a vehicle, 6 the rear hydraulic brakes having connections 7, 8 and 9 for passage of hydraulic fluid from the master cylinder 1. 10 are the front wheels of the vehicle having hydraulic brakes 11 served by lines 12 having flexible portions 13 for permitting the passage of fluid from the brakes. The front brakes are served by one of the dual master cylinders and the rear brakes by the other as will be explained.

14 is a steel casting having a pair of longitudinal bores 15 and 16 therein and a transverse bore 17. Bores 15 and 16 comprise the master cylinders and are of identical construction. Cross bore 17 is a cylinder comprising equalizing means for equalizing pressure between the master cylinders 15 and 16.

A reservoir 18 is formed above the master cylinders comprising upright walls 19 having a divided rib 20, and cover 21 which is a metal stamping having a downwardly facing flange 22 to engage inside the walls 19, and having an opening 23 through which a threaded rod 24 extends to engage a tapped hole 25 in the partition 20. The rod 24 is provided with a squared portion 26 on which a wrench may be fitted for tightening the cover and is provided with an axial bore 27 and an intersecting bore 28 serving as a breather hole and having a cap 29 thereon.

The master cylinders are identical so only one will be described in detail. In cylinder 15 is the piston 30 having a tapered rounded end 31 fitting in the tapered socket 32 of the pedal coupling socket 33. The pedal coupling socket 33 has a pair of sockets 32 for receiving the ends of the pistons and an eye bolt 34 is provided for connection to the linkage 4 for operating the pedal.

The piston 30 has flange 35 engaging the bore 15 and backing up a rubber cup 36. The piston is retained in the bore by means of ring 37 engaging flange 35 and held in place by a ring 38 snapped in place in groove 39 in the enlarged end of the bore 15. The end 40 of the piston tapers toward the head 41 which is fitted to the bore 15 and carries a rubber cup 42 arranged to act as a seal to prevent the passage of the hydraulic fluid from in front of the head to the rear thereof as the piston is forced into the cylinder, but permitting passage of fluid from the rear of the head to the compression chamber of the bore 15 as the piston is withdrawn from the cylinder. Hydraulic fluid is supplied to the rear of the head from the reservoir through port 44. Ports 43 are provided in the head of piston 30 to permit passage of fluid and to prevent air from being trapped behind the cup 42. Port 44 leads from the reservoir 18 to the bore 15 and a small port 45 is provided to take care of expansion of fluid in the braking system. This port 45 opens into the cylinder in advance of the piston head when the piston is retracted, but is cut off as the piston is forced into the cylinder as will be appreciated from reference to Fig. 3.

At its outlet end 46, the bore 15 is provided with a check valve 47 adapted to permit passage of fluid to the outlet but arranged, through cooperation of spring 48 bearing on the head 41 of piston 30, to maintain a slight pressure throughout the hydraulic system to take up slack and to prevent the system becoming air bound. This arrangement of check valve is conventional in such systems and will not be described in detail.

At the outlet end 46 of the bores 15 and 16, I provide a member 49 having a pair of bores 50 registering substantially with the bores 15 and 16. Passages 51 lead from the bores 50 through nipples 52 to which the lines 7 and 12 are connected, the line 7 being connected to one nipple and the line 12 to the other, so that one cylinder operates front brakes and the other rear brakes. A gasket 53 is provided between member 49 and the casting.

A pair of identical plugs 54, each provided with a bore 55, a squared portion 56 and ports 57, are provided to pass through the bores 50 of the member 49 to engage in threaded relationship the bores 15 and 16 as indicated at 58. The plugs 54 are somewhat smaller than the bores 50, leaving an annular opening for the passage of fluid from the ports 57 to the bores 50 and thence to the passages 51. Flanges 59 on the plugs engage the member 49 to clamp it securely in place. A gasket 60 is provided for each plug.

The bore 17 forms an equalizer cylinder and at each end thereof is provided a plug 61 having an opening 62 therein which is smaller than the bore 17. An outwardly facing valve seat 63 is provided in each plug and a double acting piston 64 is provided in the bore. Hemispherical valves 65 are provided to engage valve seats 63 and their stems 66 pass through the aperture 62 and are fixed by screw threads, as shown at 67, to the double acting piston 64 which is provided with cups 68 as shown. The valve stems 66 are of such length that when the double acting piston 64 is centrally located in the bore 17 in equilibrium, both valves 65 are open, but they are of such length that if the piston 64 moves to one side or the other, a substantial distance, one of the valves is closed. Such a situation arises when there is a rupture in one system of brakes, either the front or rear, which causes the piston 64 to move toward the side where the rupture occurs.

Passages 69 and 70 lead from opposite ends of the bore 17. The passage 69 opens through the walls of the bore 15 and the passage 70 opens through the walls of the bore 16. The passages 69 and 70 open into the bores 15 and 16 at points spaced from the ends of the working area of the bores 15 and 16 as will be seen from a reference to Fig. 3.

Caps 71 close the ends of the bore 17 but leave a space for the passage of fluid from the cylinders through the passages 69 and 70 to the apertures 62 and thus to the bore 17. The cylinders 15 and 16 and the pistons 30 are so arranged with reference to the brakes that a movement of the pistons from the brake released position shown in Fig. 3 to points adjacent the openings 69 and 70 will fully apply the brakes under ordinary conditions, that is to say, the brakes are normally applied fully by only a partial movement of the pistons 30.

The fluid in the cylinders passing through the passages 69 and 70 equalizes pressure in bores 15 and 16 since the dual acting piston 64 is free to move in the bore 17. Springs 72 normally hold this piston at the center of bore 17 in a position of equilibrium.

If in the course of applying the brakes, there is a failure or rupture of the lines to the brakes, the fluid in the master cylinder feeding the ruptured line is under less pressure than that in the other cylinder. In such a case, the piston 64 is forced by hydraulic pressure toward the side in which the rupture has occurred and fluid under pressure exerting a force against the piston 64 causes the valve 65 to close against the seat 63. When this occurs and the braking pressure is subsequently released, the piston 64 will not oscillate.

The port 69 is located at a point intermediate the ends of the working area of the bore 15. Thus, if there is a rupture in the line supplied by the cylinder 16 and the piston 64 moves over and lets fluid pass from bore 15 to bore 17, the cup 42 will pass beyond the port 69 before sufficient braking pressure is exerted to fully apply the brakes. On passing port 69, piston 30 cuts off the port 69 and the equalizer bore 17 and will trap fluid at the end 46 of bore 15 and will thus exert braking pressure to give emergency braking with one-half of the brakes.

With piston 64 motionless and valve 65 closed, there will be no further displacement of fluid into bore 17 from the cylinder 15 due to further actuation of the piston 30 within the good cylinder, which piston 30 remains operative to apply the brakes. Therefore the stroke of the piston 30 in the good cylinder 15 will, for continued operation, be of the same length as it was before rupture occurred, which eliminates loss of pedal travel for continued operation after a rupture. It will be apparent from this that the trapping of the fluid in bore 17 to hold the piston 64 motionless is done to make possible this operation.

Figure 5:
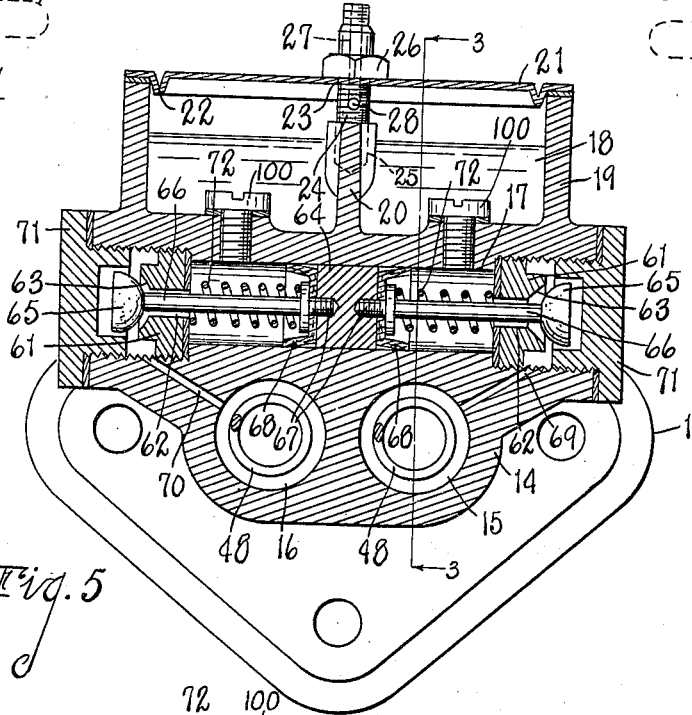
Fig. 5 is a sectional view taken on line 5—5 of Figs. 2 and 3.
Figure 6:
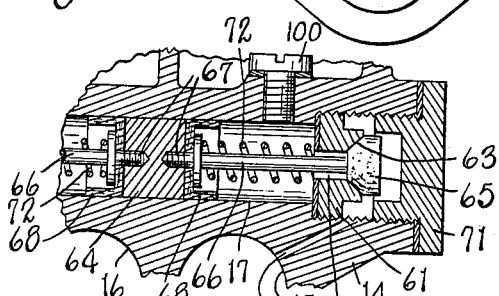
Fig. 6 is a detail sectional view showing the position of the parts of the equalizer after a failure of one master cylinder.

The screws 100 (see Fig. 5) are provided for bleeding the system preparatory to putting it into operation.

In operating my device, it is preferable to have the brakes so adjusted that the pistons 30 do not pass beyond the ports 69 and 70 when applying full braking pressure. It will be apparent that in certain instances worn brakes may require that the pistons 30 pass beyond the ports 69 and 70. The only effect of this will be that equalization is not obtained for the full application of the brakes, to-wit for the length of the stroke of the piston 30 past the ports 69 and 70.

In setting the brakes for operation it is preferable to allow a reserve pedal travel of sufficient length to make up for any loss of fluid from the good cylinder into the bore 17, which loss would occur at the time of rupture of the other cylinder. This reserve pedal travel, as above explained, would be used only at the time of the rupture and would not be necessary for continued use of the brakes prior to repairing the rupture.

In my construction, the cylinder 15 is provided with a working area in excess of that normally utilized in applying the brakes and the piston 30 is arranged so that in an emergency it will pass through the entire working area, although it passes through a portion only of the working area during normal braking. To accomplish this, I make the end 31 long enough to give a full stroke for the emergency and the pedal coupling socket 32, when in brake released position, is spaced from the ends of the bore sufficiently to permit such movement. The exposed portion of the piston and the pedal coupling socket are covered by the cover 80 which is held on the pedal coupling socket by snap ring 81 in groove 82 and on the casting by snap ring 83 in groove 84.

I have shown and described my invention in the embodiment preferred by me and desire to claim the same specifically as well as broadly, as pointed out in the appended claims.

Having thus described my invention, what I claim as new and desire to secure by Letters Patent is:

1. In a vehicle, the combination of independent front and rear hydraulic brakes, a pair of master cylinders one for the front brakes and one for the rear brakes, a fluid line from each master cylinder to its respective brakes, a piston in each master cylinder, means for simultaneously actuating said pistons, said means being adapted to move said pistons the entire length of the working area of the cylinders, equalizing means for said cylinders comprising a third cylinder having an inlet at each end smaller than the bore of the cylinder, each of said inlets having an outwardly facing valve seat, a double acting piston in the bore of said third cylinder, springs to normally hold said double acting piston in equilibrium, a valve for each valve seat, each valve having a stem extending through one of said apertures and fixed to said double acting piston, said valve stems being of sufficient length to hold said valves in open position when said double acting piston is in equilibrium but to close one valve if said double acting piston moves a substantial amount in said third cylinder, a passage leading from one inlet of said third cylinder to one master cylinder, and a passage leading from the other inlet of said third cylinder to the other master cylinder, said passages opening through the side walls of their respective master cylinders at points in the working area of said cylinders spaced from the ends of said working areas, said brakes and master cylinders being so proportioned that movement of the pistons in the master cylinders from brake released position substantially to the point of opening of said passages into said cylinders will apply the brakes for normal service.

2. In a vehicle, the combination of independent front and rear hydraulic brakes, a pair of master cylinders one for the front brakes and one for the rear brakes, a fluid line from each master cylinder to its respective brakes, a piston in each master cylinder adapted in a portion only of its travel to apply the brakes for normal service, means for simultaneously actuating said pistons, said means being adapted to move said pistons the entire length of the working area of the cylinders, equalizing means for said cylinders comprising a third cylinder having an inlet at each end smaller than the bore of the cylinder, each of said inlets having an outwardly facing valve seat, a double acting piston in the bore of said third cylinder, springs to normally hold said double acting piston in equilibrium, a valve for each valve seat, each valve having a stem extending through one of said apertures and fixed to said double acting piston, said valve stems being of sufficient length to hold said valves in open position when said double acting piston is in equilibrium but to close one valve if said double acting piston moves a substantial amount in said third cylinder, a passage leading from one inlet of said third cylinder to one master cylinder, and a passage leading from the other inlet of said third cylinder to the other master cylinder, said passages opening through the side walls of their respective master cylinders at points in the working area of said cylinders spaced from the ends of said working areas.

3. In a vehicle, the combination of independent front and rear hydraulic brakes, a pair of master cylinders one for the front brakes and one for the rear brakes, a fluid line from each master cylinder to its respective brakes, a piston in each master cylinder, means for simultaneously actuating said pistons, said means being adapted to move said pistons the entire length of the working area of the cylinders, equalizing means for said cylinders comprising a third cylinder having an inlet at each end smaller than the bore of the cylinder, each of said inlets having an outwardly facing valve seat, a double acting piston in the bore of said third cylinder, a valve for each valve seat, each valve having a stem extending through one of said apertures and fixed to said double acting piston, said valve stems being of sufficient length to hold said valves in open position when said double acting piston is in equilibrium but to close one valve if said double acting piston moves a substantial amount in said third cylinder, a passage leading from one inlet of said third cylinder to one master cylinder, and a passage leading from the other inlet of said third cylinder to the other master cylinder, said passages opening through the side walls of their respective master cylinders at points in the working area of said cylinders spaced from the ends of said working areas, said brakes and master cylinders being so proportioned that movement of the pistons in the master cylinders from brake released position substantially to the point of opening of said passages into said cylinders will apply the brakes for normal service.

4. In a vehicle, the combination of independent front and rear hydraulic brakes, a pair of master cylinders one for the front brakes and one for the rear brakes, a fluid line from each master cylinder to its respective brakes, a piston in each master cylinder adapted in a portion only of its travel to apply the brakes for normal service, means for simultaneously actuating said pistons, said means being adapted to move said pistons the entire length of the working area of the cylinders, equalizing means for said cylinders comprising a third cylinder having an inlet at each end smaller than the bore of the cylinder, each of said inlets having an outwardly facing valve seat, a double acting piston in the bore of said third cylinder, a valve for each valve seat, each valve having a stem extending through one of said apertures and fixed to said double acting piston, said valve stems being of sufficient length to hold said valves in open position when said double acting piston is in equilibrium but to close one valve if said double acting piston moves a substantial amount in said third cylinder, a passage leading from one inlet of said third cylinder to one master cylinder, and a passage leading from the other inlet of said third cylinder to the other master cylinder, said passages opening through the side walls of their respective master cylinders at points in the working area of said cylinders spaced from the ends of said working areas.

5. In a vehicle, the combination of independent front and rear hydraulic brakes, a pair of master cylinders one for the front brakes and one for the rear brakes, a fluid line from each master cylinder to its respective brakes, a piston in each master cylinder, means for simultaneously actuating said pistons, said means being adapted to move said pistons the entire length of the working area of the cylinders, equalizing means for said cylinders comprising a third cylinder having an inlet at each end, a double acting piston in the bore of said third cylinder, a passage leading from one inlet of said third cylinder to one master cylinder, and a passage leading from the other inlet of said third cylinder to the other master cylinder, said passages opening through the side walls of their respective master cylinders at points in the working area of said cylinders spaced from the ends of said working areas, said brakes and master cylinders being so proportioned that movement of the pistons in the master cylinders from brake released position substantially to the point of opening of said passages into said cylinders will apply the brakes for normal service.

6. In a vehicle, the combination of independent front and rear hydraulic brakes, a pair of master cylinders one for the front brakes and one for the rear brakes, a fluid line from each master cylinder to its respective brakes, a piston in each master cylinder adapted in a portion only of its travel to apply the brakes for normal service, means for simultaneously actuating said pistons, said means being adapted to move said pistons the entire length of the working area of the cylinders, equalizing means for said cylinders comprising a third cylinder having an inlet at each end, a double acting piston in the bore of said third cylinder, a passage leading from one inlet of said third cylinder to one master cylinder, and a passage leading from the other inlet of said third cylinder to the other master cylinder, said passages opening through the side walls of their respective master cylinders at points in the working area of said cylinders spaced from the ends of said working areas.

7. In a vehicle, the combination of independent front and rear hydraulic brakes, a pair of master cylinders one for the front brakes and one for the rear brakes, a fluid line from each master cylinder to its respective brakes, a piston in each master cylinder, means for simultaneously actuating said pistons, equalizing means for said cylinders comprising a third cylinder having an inlet at each end smaller than the bore of the cylinder, each of said inlets having an outwardly facing valve seat, a double acting piston in the bore of said third cylinder, a valve for each valve seat, each valve having a stem extending through one of said apertures and fixed to said double acting piston, said valve stems being of sufficient length to hold said valves in open position when said double acting piston is in equilibrium but to close one valve if said double acting piston moves a substantial amount in said third cylinder, a passage leading from one inlet of said third cylinder to one master cylinder, and a passage leading from the other inlet of said third cylinder to the other master cylinder.

8. In a hydraulic system, a pair of master cylinders, a piston in each master cylinder, means for simultaneously actuating said pistons said means being adapted to move said pistons the entire length of the working area of the cylinders, equalizing means for said cylinders comprising a third cylinder having an inlet in each end smaller than the bore of the cylinder, each of said inlets having an outwardly facing valve seat, a double acting piston in the bore of said third cylinder, a valve for each valve seat, each valve having a stem extending through one of said apertures and fixed to said double acting piston, said valve stems being of sufficient length to hold said valves in open position when said double acting piston is in equilibrium but to close one valve if the double acting piston moves a substantial amount in said cylinder, a passage leading from one inlet of said third cylinder to one master cylinder, and a passage leading from the other inlet of said third cylinder to the other master cylinder, said passages opening through the side walls of their respective master cylinders at points in the working area of said cylinders spaced from the ends of said working areas.

9. In a hydraulic system, a pair of master cylinders, a piston in each master cylinder, means for simultaneously actuating said pistons said means being adapted to move said pistons the entire length of the working area of the cylinders, equalizing means for said cylinders comprising a third cylinder having an inlet in each end smaller than the bore of the cylinder, each of said inlets having an outwardly facing valve seat, a double acting piston in the bore of said third cylinder, a valve for each valve seat, each valve having a stem extending through one of said apertures and fixed to said double acting piston, said valve stems being of sufficient length to hold said valves in open position when said double acting piston is in equilibrium but to close one valve if the double acting piston moves a substantial amount in said cylinder, a passage leading from one inlet of said third cylinder to one master cylinder, and a passage leading from the other inlet of said third cylinder to the other master cylinder.

10. Equalizing means for a pair of hydraulic cylinders, comprising a third cylinder having an inlet at each end smaller than the bore of the cylinder, each of said inlets having an outwardly facing valve seat, a double acting piston in the bore of said third cylinder, a valve for each valve seat, each valve having a stem extending through one of said apertures and fixed to said double acting piston, said valve stems being of sufficient length to hold said valves in open position when said double acting piston is in equilibrium but to close one valve if said double acting piston moves a substantial amount in said third cylinder, a passage leading from one inlet of said third cylinder to one master cylinder, and a passage leading from the other inlet of the third cylinder to the other master cylinder.

MAX E. BOWEN.